June 1, 1965  W. P. SCHMITTER ET AL  3,186,255
GEAR DRIVE ENCLOSURE
Filed Jan. 16, 1963  4 Sheets-Sheet 1

INVENTORS
GEORGE P. MAURER and
WALTER P. SCHMITTER, DECEASED
BY A. LOUISE SCHMITTER
ROBERT V. ABENDROTH,
CO-EXECUTORS BY Adrian L. Bateman, Jr.
ATTORNEY

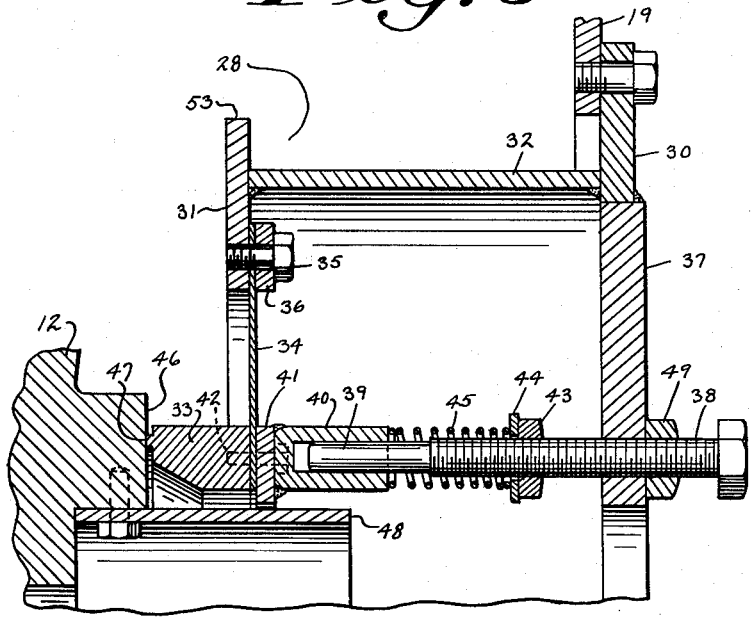
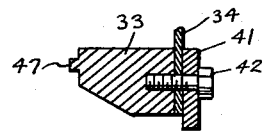
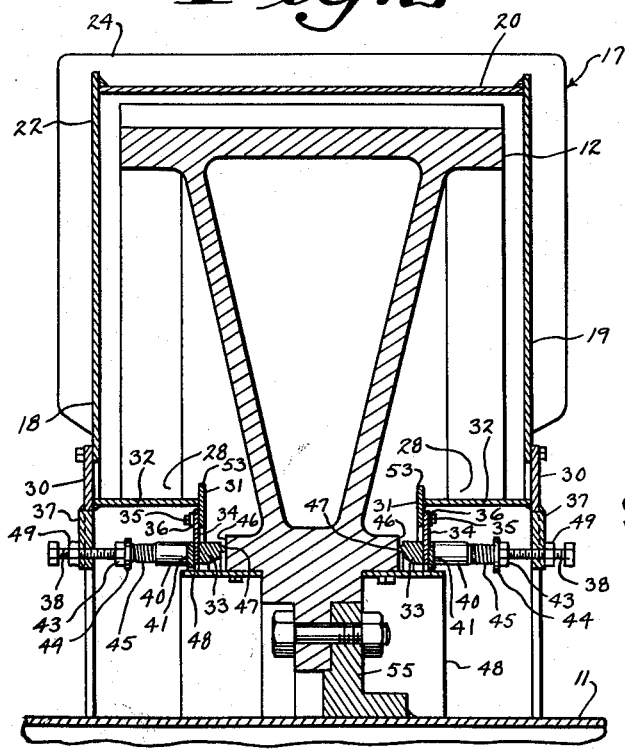

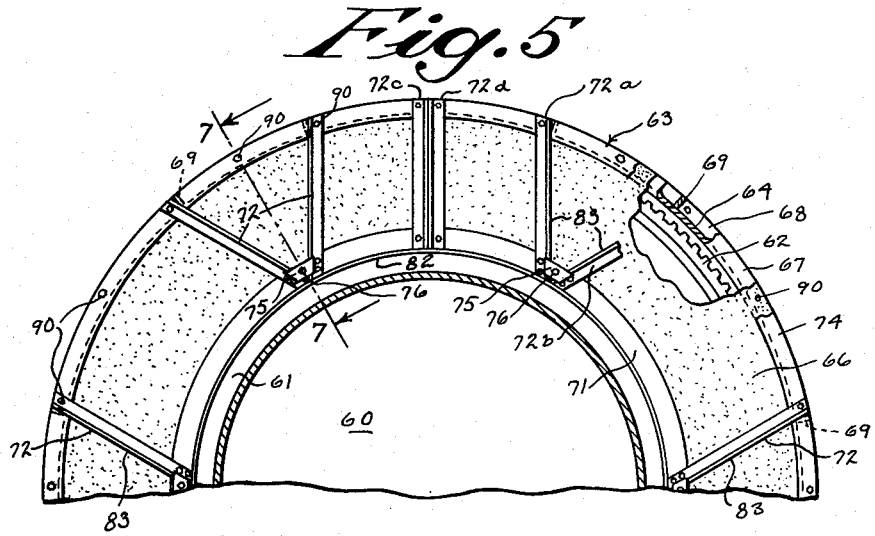
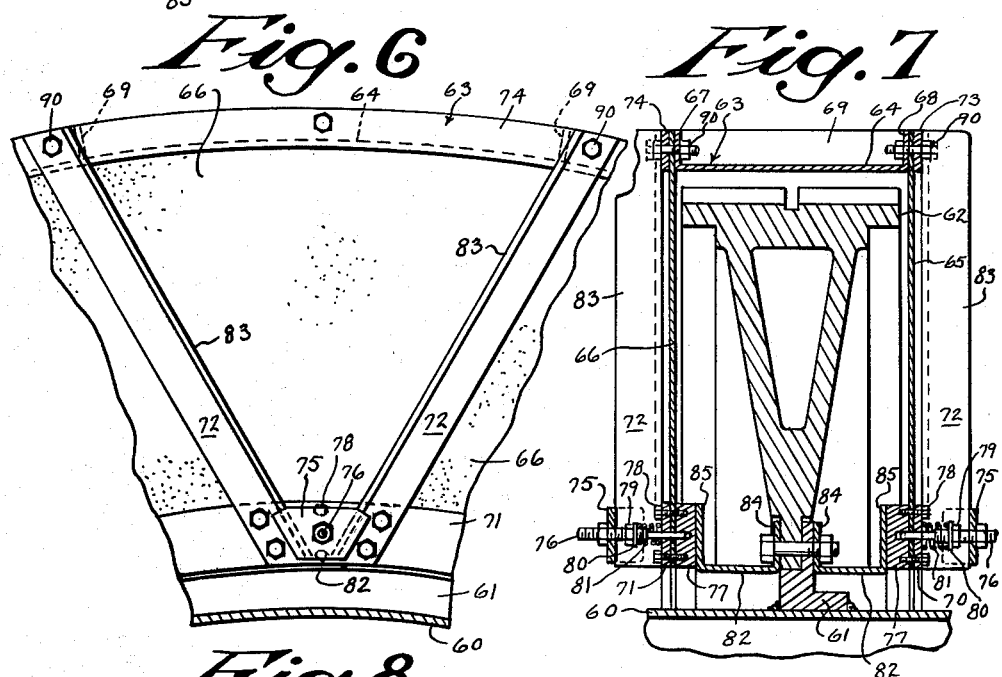
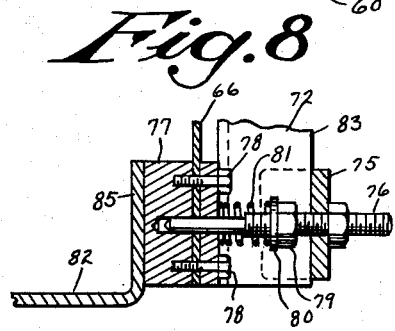

June 1, 1965 W. P. SCHMITTER ET AL 3,186,255
GEAR DRIVE ENCLOSURE
Filed Jan. 16, 1963 4 Sheets-Sheet 4

INVENTORS
GEORGE P. MAURER and
WALTER P. SCHMITTER, DECEASED
BY A. LOUISE SCHMITTER
ROBERT V. ABENDROTH
CO-EXECUTORS

BY
ATTORNEY

United States Patent Office 3,186,255
Patented June 1, 1965

3,186,255
GEAR DRIVE ENCLOSURE
Walter P. Schmitter, deceased, late of Wauwatosa, Wis., by A. Louise Schmitter, Wauwatosa, Wis., and Robert V. Abendroth, Whitefish Bay, Wis., co-executors, and George P. Maurer, Wauwatosa, Wis., assignors to The Falk Corporation, Milwaukee, Wis., a corporation of Wisconsin
Filed Jan. 16, 1963, Ser. No. 252,279
12 Claims. (Cl. 74—606)

This invention relates to power transmission enclosures; more particularly, it relates to gear type transmission enclosures having improved dust and fluid integrity.

In many applications of gear-type power transmissions, it is necessary to provide some form of enclosure for the gears in the transmission that will have a high degree of fluid and dust integrity. A substantially fluid-proof gear enclosure is important in order to enable the use of fluid lubricants for the gears in the transmission. Dust integrity in a gear enclosure is important in order to prevent an unduly high rate of gear wear by encroachment of dust or other similar foreign matter from the surroundings in which the transmission operates onto the intermeshing gear tooth surfaces. A gear enclosure which completely surrounds the gears in a gear transmission and has a seal between itself and a shaft which carries at least one of the gears in the transmission is, of course, well known and in widespread use. This type of gear enclosure will be denominated herein as a "shaft-seal" gear enclosure and it is capable of providing a high degree of dust and fluid integrity. However, a shaft-seal gear enclosure cannot be used in many gear transmission applications, particularly those which involve very large gears or those which use ring gears, often of large diameter, that are attached to the periphery of rotatable apparatus such as mills, kilns, etc. In this latter instance, it is necessary to resort to what shall be herein termed a "gear-seal" enclosure which utilizes a seal between the enclosure and a portion of at least one of the gears in the gear transmission it is designed to protect. In previous gear-seal enclosures, the seal is usually provided between inner peripheral portions of each side of the enclosure and a flange secured to the opposed side surfaces of the gear. Such arrangements result in a radial sliding seal peripherally disposed about the gear. Because of the radial arrangement of the seal, no effective means has been devised for maintaining sealing contact under conditions of expansion and contraction of the gear and drum, wear on mill supporting trunnions and other factors which cause relative radial movement between the sealing surfaces. Thus, the presently known forms of gear-seal enclosures have failed to provide as effective a degree of dust-proofness and fluid-proofness as the known forms of shaft-seal gear enclosures and they are not, therefore, generally considered an effective form of gear enclosure. These deficiencies in the known types of gear-seal enclosures are due largely to the lack of an effective floating sealing means between this type of enclosure and the gear or gears it is designed to protect. This undesirable feature causes this form of gear enclosure to develop clearances at the seal, resulting in a reduced degree of dust-proofness and a generally inadequate degree of fluid-proofness to enable the use of modern fluid lubricants and, consequently, tacky, substantially non-fluid lubricants must generally be employed.

A typical application of the gear-seal form of gear enclosures to which this invention relates is a cement mill which is driven by a ring gear attached to the exterior of the mill and an intermeshing pinion. Such an installation makes necessary the use of an enclosure for the gear drive, but the commonly-used types of enclosures have proved generally inadequate for the reasons mentioned above.

A principal object of this invention is to provide a gear-seal type of gear transmission enclosure which is substantially more dust-proof than the known types of this form of gear enclosure. Another principal object is to provide a gear-seal type enclosure which is substantially more fluid-proof than known types of this form of gear enclosures, thereby permitting the use of fluid lubrication systems for the gear drive. A further object is to provide an improved floating sealing means for the gear-seal type of gear drive enclosure which will maintain effective sealing even though the gear which it contacts may be subjected to radial and axial movement. These and other objects will become apparent from the description which follows.

The objects of this invention are satisfied briefly, by providing an enclosure surrounding the intermeshing tooth surfaces of a gear drive which it is desired to protect and having an improved sealing means disposed axially between the enclosure and opposed side faces of a gear in the drive. The sealing means is free to move axially so that good sealing may be maintained between the side faces of the gear and the enclosure even though the gear may be subjected to some measure of axial movement or run-out such as may be occasioned by operation at high ambient temperatures, inaccuracies in machine or gear installation, wear of machine and foundation parts, etc. The use of the enclosures of this invention also permits, for the first time, the incorporation therewith of circulating fluid lubrication systems which may not now be used with known types of this general class of gear enclosures.

In the description, reference is made to the accompanying drawings which form a part hereof and in which there are shown by way of illustration and not of limitation three specific forms in which this invention may be practiced.

In the drawings:

FIG. 2 is an enlarged sectional view of a portion of the apparatus of FIG. 1 taken along the plane of line 2—2 of FIG. 1, looking in the direction of the arrows;

FIG. 3 is an enlarged fragmentary view of a portion of FIG. 2 illustrating a form of axially movable sealing means according to this invention;

FIG. 4 is an enlarged fragmentary view of a portion of FIG. 2 showing in detail the attachment of a sealing ring to a flexible diaphragm member;

FIG. 5 is a partial view in elevation with a portion broken away and portions in section of an alternate embodiment of this invention;

FIG. 6 is an enlarged fragmentary view of a portion of the gear enclosure shown in FIG. 5;

FIG. 7 is an enlarged sectional view with parts broken away taken along the plane of line 7—7 of FIG. 5, looking in the direction of the arrows;

FIG. 8 is an enlarged sectional view showing in greater detail the axially movable sealing means of the embodiment illustrated in FIG. 7;

Figure 11:
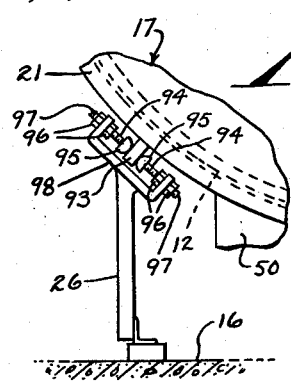
Figure 9:
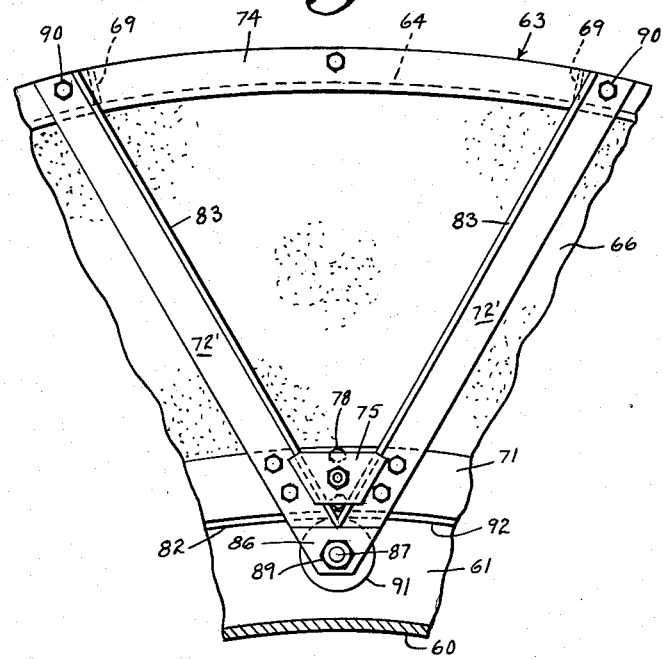
Figure 10:
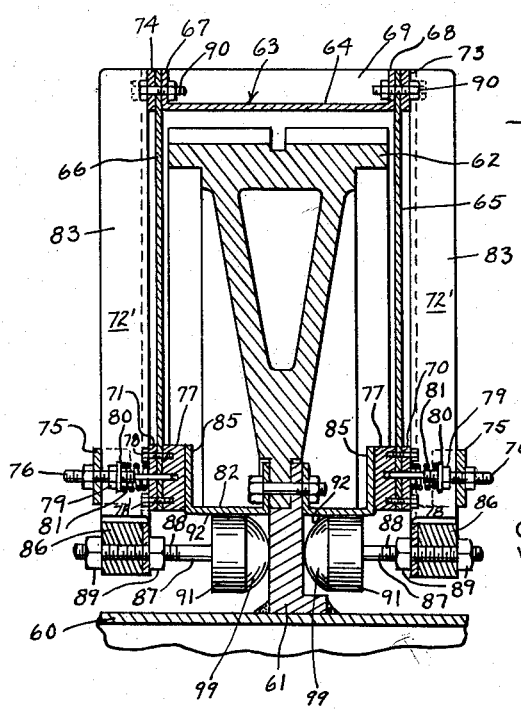

FIGS. 9 and 10 illustrate a further alternate embodiment in which the entire enclosure is mounted on rollers to permit floating of the enclosure as a unit. FIGS. 9 and 10 correspond in other respects to FIGS. 6 and 7; and FIG. 11 is a fragmentary view illustrating an alternate to the enclosure supporting means of FIG. 1, said alternate supporting means being for use with the embodiment illustrated in FIGS. 9 and 10.

Figure 1:
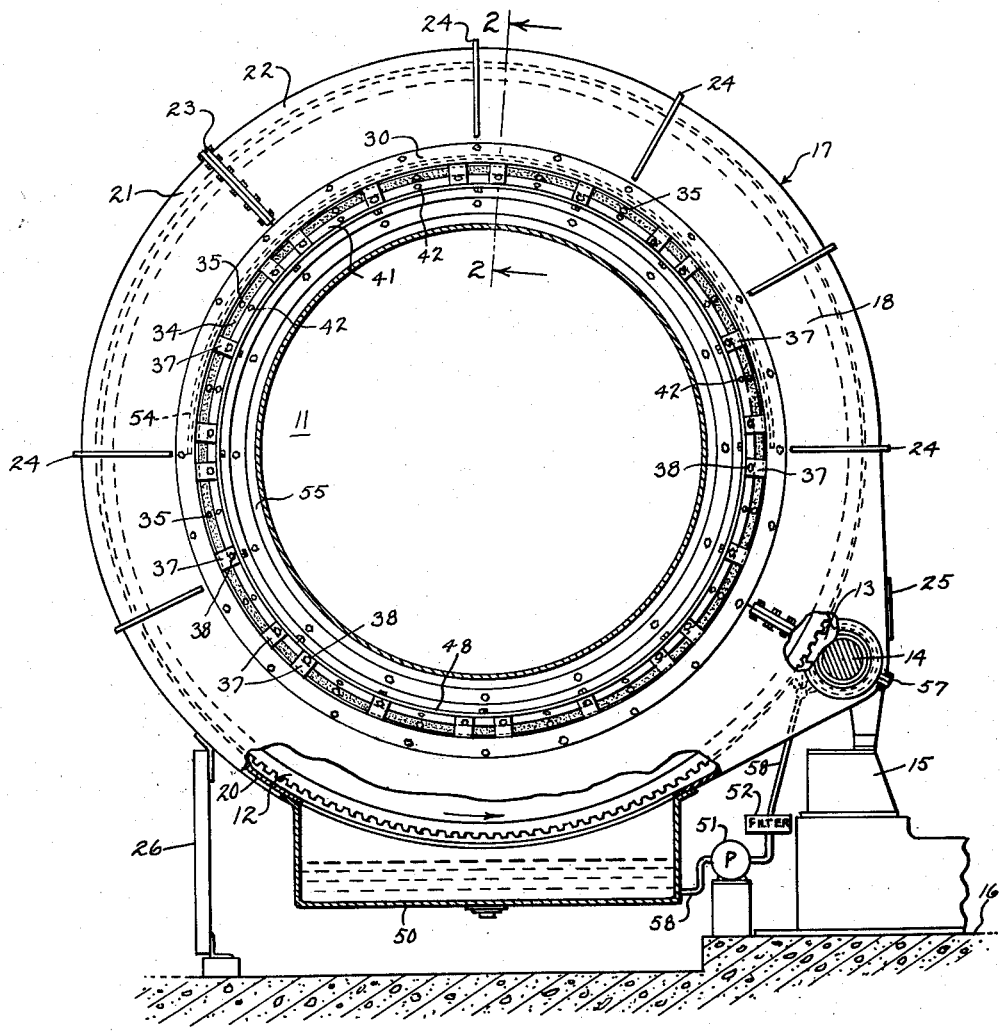
FIG. 1 is a view in elevation with parts broken away of a cement mill provided with a gear drive enclosure constructed according to this invention, portions of the view being in section.

Referring to the details of the drawings, in FIG. 1 there is shown a cement mill 11 driven by a gear drive comprising a ring gear 12 attached to the exterior of the mill and intermeshed with a pinion 13. As shown in FIG. 2, the gear 12 may be bolted to a flange 55 welded the the outer circumference of the mill 11. Returning to FIG. 1, the pinion 13 and its associated drive shaft 14 are rotatably journaled on a suitable support 15 resting on the foundation 16 of the mill. An enclosure 17 is shown as surrounding the teeth of the gear 12 and the pinion 13. As indicated most clearly in FIG. 2, the enclosure 17 includes a pair of spaced side walls 18 and 19 which extend inwardly of the teeth of the gear so that their inner edges lie adjacent opposite sides of the gear. The side walls of the enclosure are securely interconnected by a circumferential wall 20 which covers the outer circumferential surfaces of the gear and pinion teeth. The enclosure 17, which may be of sheet metal construction, is preferably formed in two portions 21 and 22 (FIG. 1) to facilitate fabrication and installation, with each portion subsequently being joined together by suitable flanges and bolts as at 23 and 57. U-shaped stiffeners 24, radially spaced around the enclosure, may be welded to the three walls of the enclosure (FIG. 2) to lend rigidity to the structure. Returning to FIG. 1, the drive shaft 14 for the pinion may pass through the side walls 18 and 19 of the enclosure 17, in which event suitable rubber or similar O-ring type seals should be inserted between the enclosure walls and the shaft so as to preserve the dust and fluid integrity of the enclosure in a manner known in the art. If desired, an inspection plate 25 may be provided along the circumferential wall 20 near the pinion 13. The enclosure 17 may be supported by a post 26 attached to a wall of the enclosure at its upper end and secured to the foundation 16 at its lower end. The other side of the enclosure 17 may be supported by the pinion shaft support 15. The enclosure as thus described surrounds the teeth of the gears in the gear drive and has side portions arranged along each side face of a gear in the drive. As will be more fully explained below, there is a seal provided between the side portions of the enclosure 17 and the side faces of the ring gear 12 and this enclosure is thus of the type referred to hereinabove as a "gear-seal" form of gear enclosure.

Axially movable sealing means are attached to each side portion of the enclosure so as to provide a substantially dust-proof and fluid-proof seal between each side of the gear 12 and the enclosure 17. Because the structure is similar on both sides of the gear, the following description of the sealing means and its supporting structure will be with reference to only one side, it being understood that the seal along the other side is the same. As shown in FIGS. 2 and 3, an outer annular ring 30 is securely attached to the outer face of the enclosure side wall 19 and an inner annular ring 31, arranged between the outer ring and a side face 46 of the gear 12, is securely attached, as by weldments, to the outer ring by a circumferential wall 32. A sealing ring 33 is flexibly attached to the inner ring 31 by means of a flexible ring or diaphragm 34 formed of a deformable material such as rubber or synthetic rubber coated fabric, fiber glass, asbestos cloth, plastic film, and the like, which is sufficiently impervious to dust and fluid to maintain a good enclosure. The sealing ring 33 bears against the side face 46 of the gear to provide a dust-proof and fluid-proof seal at this juncture and the said gear face is preferably machined and polished along the juncture to enhance the seal. The sealing ring 33 should be formed of a low-friction solid material such as soapstone, carbon, and the like, which is also impervious to oil and dust; plastics such as nylon or "Teflon" may be useful in some applications. The sealing ring 33 is preferably formed of a number of arcuate segments which are joined together to provide an annular shape. Thus, the sealing ring 33 may be formed of eight 45° segments with the joints between segments covered by flexible adhesive strips to preserve the oil and dust integrity of the sealing ring. A narrow annular land 47 may be provided along the inner edge of the sealing ring 33 to contact the side of the gear and facilitate the attainment of a good seal as soon as possible after the sealing means are installed. The narrow land 47 will rather quickly conform to the surface of the gear side and thus provide a good temporary seal during the early stage of the installation. After initial wear of the land, the balance of the inner end of the sealing ring will contact the side of the gear and establish a permanent seal. The flexible ring 34 should be flexible enough to act as a diaphragm and permit axial movement of the sealing ring 33 in unison with axial movement or run-out of the gear 12. This flexible suspension of the sealing ring 33 contributes toward providing one of the desirable features of the gear enclosure of this invention, namely, the ability to adjust to axial movement of the gear and yet maintain a good seal. As is also apparent from the drawings, the seal is not affected by radial expansion or contraction of the gear or mill as relative radial movement between sealing ring 33 and gear surface 46 may occur without effect upon the seal. The flexible ring 34 may be cut from a single piece of material or may be formed from arcuate segments jointed together. The outer edge of the flexible ring 34 may be attached to the inner ring 31 by means of a series of bolts 35 and washers 36 spaced about the inner ring, see FIG. 3.

A number of brackets 37 (FIGS. 1 and 3) are radially attached to the outer ring 30, as by weldments, and each bracket carries a shaft 38 near its inner end. One such shaft and bracket assembly will be described, it being understood that the others are of similar construction. As shown in FIG. 3, the inner end 39 of the shaft 38 is received in a block 40 which is attached, such as by weldments, to an annular ring 41. The ring 41 and the sealing ring 33 are joined together by means of bolts 42 with the inner portion of the flexible ring 34 clamped between the ring 41 and the sealing ring 33. An intermediate portion of the shaft 38 may be threaded to receive a nut 43 and washer 44, with a compression spring 45 arranged between the washer and the block 40 to yieldably urge the sealing ring 33 into contact with the side of the gear. The sealing ring is thus spring-biased into contact with a side face of the gear as an aid to providing and maintaining good contact between the gear and the sealing ring. Further, the shaft 38 may be adapted for axial adjustment by extending the threaded portion through the opening in the bracket 37 and providing a locking nut 49 to lock it into its desired position. Thus, suitable spring pressure may be applied when the enclosure is initially installed to provide good contact between the sealing ring and gear side and, thereafter, the pressure may be adjusted as desired to compensate for wear of the sealing ring. As indicated in FIG. 1, a number of brackets 37 carrying shafts 38 may be spaced at suitable intervals about the circumference of the outer ring 30 to properly support and apply spring loaded pressure to the sealing ring 33. An annular dust shield 48 may be attached to the gear near the juncture of the sealing ring 33 and the sealed side of the gear so as to project axially outwardly therefrom to aid in preventing dust and other foreign matter from reaching the sealing area. This feature is most clearly shown in FIGS. 2 and 3.

Because the gear drive enclosures of this invention provide an effective fluid seal between the gear and the enclosure, it is possible to incorporate a circulating fluid lubricant system therewith. Referring now to FIG. 1, a lubricant supply tank 50 may communicate with the interior of the gear enclosure 17 along its lower periphery to contain a supply of suitable fluid lubricant. A pump 51 and suitable piping 58 may be connected between the tank 50 and the enclosure to supply lubricant to a selected portion of the gear teeth, such as near the juncture of the pinon and gear. If desired, a filter 52 may also be incorporated in the lubrication system. Referring to FIG. 3, the upper portion 53 of the inner ring 31 may extend upwardly of the circumferential wall 32 to provide a trough, indicated at 28 in FIG. 3, about approximately the upper 180° of the periphery of the gear 12 as shown by dotted lines 54 in FIG. 1, to facilitate the return to the tank 50 of lubricant carried upwardly by the gear teeth. This trough may be provided about the entire circumference of the gear 12 if desired. The enclosures of this invention thus permit the use of a pressure-type fluid lubricant system for gear drives of this type instead of the tacky, non-flowing lubricants which are now required by known types of enclosures.

An alternate form in which this invention may be practiced is shown in FIGS. 5 through 8, in which there is illustrated a portion of a mill 60 carrying a flange 61 to which is attached a ring gear 62 that intermeshes with a pinion, not shown for driving the mill. Since the mill and gear drive shown in this embodiment may be the same as that in FIGS. 1 through 4, parts which would be apparent to those skilled in the art have been omitted from FIGS. 5 through 8. A gear-seal type enclosure 63 is depicted as surrounding the teeth of the gears in the gear drive associated with the mill 60, the enclosure comprising a circumferential wall 64 which securely interconnects a pair of spaced side walls 65 and 66. The circumferential wall 64 is preferably of sheet metal with the U-shaped cross section shown in FIG. 7 to provide a pair of vertical flanges 67 and 68 along each side of the ring gear. Although the circumferential wall is illustrated as being formed of a single piece of material it may also comprise several members joined together to provide the desired configuration. Stiffeners 69 may be arranged between the vertical flanges 67 and 68 of the circumferential wall, there being a plurality of such stiffeners spaced about the circumference of the wall.

In this embodiment, the side wals 65 and 66 of the enclosure are of flexible material such as rubber or synthetic rubber coated fabric, fiber glass, asbestos cloth, plastic film, and the like which is sufficiently impervious to dust and fluid to provide a good enclosure. As indicated in FIG. 7, the outer peripheral portion of side wall 65 is clamped between the vertical flange 67 of the circumferential wall and an outer clamp ring 73, with a series of bolts 90 spaced about the circumference of the ring 73 to secure the ring and side wall to the flange. The outer peripheral portion of side wall 66 is similarly joined to the vertical flange 68 by an outer clamp ring 74. An inner ring 70 is provided along the inner peripheral portion of the side wall 65 and joined to the vertical flange 67 by means of a series of braces 72 which are attached along their inner ends to the ring 70 and along their outer ends to the vertical flange 67. Another inner ring 71 is provided along the inner peripheral portion of side wall 66, which is similar to the inner ring 70 and is attached to the vertical flange 68 by braces 72 in the manner previously described. It is preferred that the braces 72 be spaced about the side walls of the enclosure to provide six equally-spaced V-shaped assemblies such as that shown by 72a and 72b in FIG. 5 around each side thereof, although the number of such assemblies will depend on each particular installation. When the enclosure 63 is made in several sections, braces 72 may be arranged at the ends of abutting sections as illustrated by braces 72c and 72d, and bolted together to join the sections into a complete enclosure. As indicated in the drawings, the braces 72 are preferably of angle iron with an L-shaped cross section and the outer clamp rings 73 and 74 and inner rings 70 and 71 are preferably of steel to provide the required structural strength. The enclosure as described to this point comprises a braced structure arranged to enclose the teeth of a gear drive. The enclosure may be suitably supported on a machine or other foundation members by means not shown to prevent it from rotating when the gear drive is operating; this supporting means may be similar to that shown in connection with the embodiment of FIGS. 1, 2 and 3.

Near the apex of each assembly of braces 72, there is mounted a plate 75 which rests upon the outwardly extending portion 83 of each converging pair of braces. A threaded shaft 76 is threaded through each plate 75 and each such shaft is long enough to extend through either the ring 70 or the ring 71 depending upon the side of the enclosure upon which it is positioned. A sealing ring 77 is arranged along the inner surface of the inner edge of each side wall and joined to the ring 70 or 71 respectively by means of a plurality of bolts 78 spaced about the circumference of the rings 70 and 71, with each side wall thus clamped between one of the rings and the sealing ring. The sealing rings 77 should be of the same type of material as the sealing ring 33 described above in connection with the embodiment of FIGS. 1–4, i.e., a low friction solid material which is impervious to oil and dust, and may also be formed of arcuate sections joined together. The threaded shafts 76 project through the rings 70 or 71 and are received in suitable cavities in the sealing rings 77. A nut 79 and washer 80 are positioned along an intermediate portion of each shaft 76 and a compression spring 81 is arranged around the shaft to abut the washer at one end and the ring 70 at the other to thereby urge the sealing rings toward the sides of the gear 62.

Because a gear such as the gear 62 is generally substantially more narrow across its inner portion near the mill than across the teeth at its outer portion, it is preferable to attach an annular member to each side of the gear to provide a bearing surface near the sealing rings. For this purpose, a face ring 82 is attached to each side of the gear 62. The face ring 82 has a U-shaped cross section with a flange portion 84 abutting the gear and a flange portion 85 abutting the innermost surface of the sealing ring 77. The necessity for the use of the face rings will naturally depend upon the relative dimensions of the gear used in any particular application. As illustrated in FIG. 7, the dust and oil proof seal is formed between each sealing ring 77 and face ring 82; when the face rings are omitted, the seal may be formed between each sealing ring 77 and a side of the gear 62. It is also preferable that either the face ring or side of the gear in contact with the sealing ring 77 be machined and polished smooth to provide a good sealing juncture.

As is apparent from the foregoing description, the sealing means in the second embodiment are rendered axially movable by mounting them on the flexible side walls of the enclosure. This feature will thus provide an effective seal between the enclosure and the gear drive even though the gear with which the seal is formed may be subjected to axial movement or run-out. A fluid lubricant system of the type described above with reference to FIG. 1 may also be incorporated with the enclosure of this embodiment.

Referring now to FIGS. 9 and 10, the parts thereof which correspond to similar parts in FIGS. 6 and 7 bear the same number and, hence, a description thereof will not be repeated. It will be noted, however, in FIG. 9 that braces 72' have been extended at their inner ends so that they extend beyond inner rings 70 and 71, respectively. On these extended portions of each pair of braces 72' are provided a series of rectangular mounting blocks 86, welded or otherwise securely attached to the braces. Through each mounting block 86 is passed a shaft 87, which may be adjustably attached adjacent its outer end to the mounting block by a threaded portion 88 on the shaft and nuts 89 tightened to secure the shaft 87 rigidly to mounting block 86.

Each shaft 87 carries at its inner end a roller 91, journaled for free rotation with respect to the shaft, and arranged to peripherally engage a raceway 92 formed on the horizontal portion of U-shaped face ring 82. The raceway 92 is preferably formed by machining the inner horizontal surface of face ring 82 to provide a smooth circular surface for contact with the peripheral surfaces of rollers 91. The rollers 91 are provided with spherical faces 99 which engage the sides of the flange 61 (see FIG. 10).

In the embodiment of FIGS. 9 and 10, the gear enclosure of this invention is supported radially by the plurality of pairs of rollers 91 spaced radially around the enclosure with each roller providing support through peripheral contact with raceway 92. The enclosure is restrained and located axially by the engagement of the spherical faces 99 of the rollers 91 with the sides of the flange 61. Rotation of the enclosure is prevented, irrespective of the direction of the rotation of the gear 12, by a support as shown in FIG. 11. The support of FIG. 11 is a modified form of the support 26 of FIG. 1 in which a torque lug 93 is rigidly secured to the outer peripheral surface of the enclosure and is disposed between two adjustable torque reaction members 94 each having a spherical head 95 for engagement with torque lug 93. Adjustment of the torque reaction members is effected in a known manner by means of nuts 96 and threaded shafts 97. The torque reaction members are held stationary after adjustment by means of bracket 98 securely fixed to post 26.

The rollers 91 are axially adjustable to properly locate and align the enclosure in an axial direction and the entire enclosure may shift axially in the event of substantial axial shift of the mill or kiln or its ring gear. The springs 81 will maintain equal forces in the seals on the opposite sides of the gear.

It should be understood that the roller mounted embodiment of FIGS. 9, 10 and 11 is equally adapted to the enclosure described in detail in connection with FIGS. 1–4.

Three specific forms in which this invention may be practiced have been described. While the gear drive enclosures of this invention have been described with reference to cement mills they are not limited to use with such equipment but, instead, may be employed with a wide variety of other machines and apparatus. It is expected that those skilled in the art will be able to make modifications and changes in the enclosures described and illustrated herein and yet remain within the true scope of this invention; accordingly, it is intended that such modifications and changes be included within the scope of the appended claims.

We claim:

1. An enclosure for a gear drive of the type including a circumferential wall adapted to surround the teeth of a gear in the drive and also including side walls enshrouding both sides of at least one gear in the drive, said side walls being substantially impervious to dust and fluids and at least a portion of each side wall being of flexible material; sealing means attached to each side wall of the enclosure along said portion thereof which is of flexible material, each sealing means contacting a side of said one gear to form a substantially dust-proof and fluid-proof seal between the side of the gear which it contacts and the side wall to which it is attached; and means attached to the enclosure and adapted to urge each sealing means inwardly into contact with its respective side of the gear.

2. In an enclosure for a gear drive, said enclosure including a circumferential wall adapted to surround the teeth of at least one gear in the drive and also including side walls attached to the circumferential wall and arranged along both sides of at least one gear in the drive, said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; and means attached to the enclosure and adapted to urge each sealing means into contact with a respective side of the gear, said means comprising a plurality of brackets supported from said enclosure, a shaft mounted in each bracket and attached to a sealing means along its inner end, each shaft further carrying a spring arranged to urge a sealing means inwardly for contact with a side of the gear.

3. In an enclosure for a gear drive, said enclosure being of the type adapted to surround the teeth of a gear in the drive and having side portions arranged along both sides of said gear, the combination with said enclosure of axially movable sealing means mounted on each side portion of the enclosure to provide a substantially dust-proof and fluid-proof seal between the enclosure and respective side surfaces of the gear; support structure for each sealing means comprising an outer ring attached to a side portion of the enclosure, an inner ring arranged between a side of the gear and the outer ring and connected to the outer ring by a circumferential wall, and a flexible ring attached near its outer peripheral edge to the inner ring and attached near its inner peripheral edge to a sealing means; and means for urging each sealing means into contact with a respective side surface of the gear comprising a plurality of brackets mounted at intervals about an outer ring, a shaft mounted in each bracket and attached to a sealing means at its inner end, each shaft further carrying a spring arranged to urge a sealing means into contact with a side surface of the gear.

4. In an enclosure for a gear drive, said enclosure being of the type adapted to surround the teeth of a gear in the drive and having side portions arranged along both sides of at least one gear in the drive, the combination with said enclosure of axially movable sealing means mounted on each side portion of the enclosure to provide a substantially dust-proof and fluid-proof seal between the enclosure and the gear drive; support structure for each of the sealing means comprising an outer ring attached to a side portion of the enclosure, an inner ring arranged between a side of the gear and the outer ring and connected to the outer ring by a circumferential wall, and a flexible ring attached near its outer peripheral edge to the inner ring and attached near its inner peripheral edge to a sealing means; means for urging each sealing means into contact with its respective side of the gear comprising a plurality of brackets mounted at intervals about the outer ring, a shaft mounted in each bracket and attached to a sealing means at its inner end, each shaft further carrying a spring arranged to urge a sealing means into contact with a side of the gear; and fluid lubricant means arranged to furnish lubricant to a selected portion of the gear teeth within the enclosure.

5. In an enclosure for a gear drive, said enclosure being of the type adapted to surround the teeth of a gear in the drive and having side portions arranged along both sides of at least one gear in the drive, the combination with said enclosure of axially movable sealing means mounted on each side portion of the enclosure to provide a substantially dust-proof and fluid-proof seal between the enclosure and the gear; support structure for each of the sealing means comprising an outer ring attached to a side portion of the enclosure, an inner ring arranged between a side of the gear and the outer ring and connected to the outer ring by a circumferential wall, and a flexible ring attached near its outer peripheral edge to the inner ring and attached near its inner peripheral edge to a sealing means; means for urging each sealing means into contact with its respective side of the gear, each of said means including a plurality of brackets mounted at intervals about the outer ring, a shaft mounted in each bracket and attached to a sealing means at its inner end, each shaft further carrying a spring arranged to urge a sealing means into contact with a side of the gear; and fluid lubricant means comprising a lubricant supply tank communicating with the enclosure, a lubricant supply line leading from the tank to a selected portion of the gear teeth and a pump arranged to deliver lubricant therethrough.

6. An enclosure for a gear drive including a circumferential wall adapted to surround the teeth of at least one gear in the drive and also including side walls attached to the circumferential wall and enshrouding both sides of said one gear in the drive; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; roller means attached to the enclosure and disposed peripherally around each side of said gear; and a peripheral raceway disposed on each side of the gear, said rollers adapted for rolling contact with the raceways to provide a floating mounting for said enclosure.

7. An enclosure for a gear drive including a circumferential wall adapted to surround the teeth of at least one gear in the drive and also including side walls attached to the circumferential wall and enshrouding both sides of said one gear in the drive; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; a plurality of roller means secured to each side wall of the enclosure and disposed peripherally around each side of said gear; and a peripheral raceway secured to each side of the gear, said rollers adapted for rolling contact with the raceways to provide a floating mounting for said enclosure.

8. An enclosure for a gear drive including a circumferential wall adapted to surround the teeth of at least one gear in the drive and also including side walls attached to the circumferential wall and enshrouding both sides of said one gear in the drive; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; roller means attached to the housing and disposed peripherally around each side of said gear; a peripheral raceway disposed on each side of the gear, said rollers adapted for rolling contact with the raceways to provide a floating mounting for said enclosure; and torque reaction means secured to said enclosure and an immovable foundation to prevent rotation of the enclosure.

9. An enclosure for a gear drive including a circumferential wall adapted to surround the teeth of at least one gear in the drive and also including side walls attached to the circumferential wall and enshrouding both sides of said one gear in the drive; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; roller means mounted on each side wall of the enclosure and dispose in spaced relationship peripherally around each side of said gear, each said roller means being adjustable for axial orientation of each roller; a peripheral raceway secured to each side of the gear and providing a rolling contact surface for each of the rollers, said rollers and raceways cooperating to provide a floating mounting for said enclosure.

10. Apparatus according to claim 9 including torque reaction means secured to the enclosure and to a foundation to prevent rotation of the enclosure.

11. An enclosure for a gear drive including a circumferential wall adapted to surround the teeth of at least one gear in the drive and also including side walls attached to the circumferential wall and enshrouding both sides of said one gear in the drive; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; axially adjustable rollers mounted on each side portion of the enclosure and disposed in spaced relationship peripherally around each side of the gear, said rollers having spherical inwardly directed side faces adapted to engage sides of said gear radially inwardly of said sealing means for axial location and restraint of said enclosure; a peripheral raceway secured to each side of the gear and providing a rolling contact surface for each of said rollers, said rollers and raceways cooperating to provide a floating mounting for said enclosure.

12. In combination with a ring gear mounted on a radial flange secured about the periphery of a rotatable apparatus, an enclosure for the ring gear including a circumferential wall adapted to surround the teeth of the gear and having side walls attached to the circumferential wall and enshrouding both sides of the gear; said side walls of the enclosure being of flexible material substantially impervious to dust and fluids; sealing means attached to each side wall of the enclosure, each side sealing means contacting a side of said one gear to form a substantially dust-proof and fluid-proof seal between the side of the gear which it contacts and the side wall to which it is attached, said sealing means being axially movable by reason of the flexibility of the side walls of the enclosure; means attached to the enclosure and adapted to urge each sealing means inwardly into contact with its respective side of the gear; rollers mounted for axial adjustment on each side wall of the enclosure and disposed in spaced relationship peripherally around each side of said gear, said rollers having spherical inwardly directed side faces adapted to engage the sides of said flange for axial location and restraint of said enclosure; a peripheral raceway secured to each side of the gear and providing a rolling contact surface for each of said rollers, said rollers and raceways cooperating to provide a floating mounting for said enclosure.

References Cited by the Examiner

UNITED STATES PATENTS

| | | | |
|---|---|---|---|
| 1,048,328 | 12/12 | Maize | 74—606 |
| 2,189,197 | 2/40 | Cerny | 277—42 |
| 2,214,485 | 9/40 | Short | 74—606 |
| 2,814,513 | 11/57 | Kupfert et al. | 277—42 |
| 3,029,661 | 4/62 | Schmitter | 74—606 |

FOREIGN PATENTS 337,037    4/59    Switzerland.

BROUGHTON G. DURHAM, *Primary Examiner.*